(12) United States Patent
Tetali et al.

(10) Patent No.: US 10,878,424 B2
(45) Date of Patent: Dec. 29, 2020

(54) SYSTEMS AND METHODS FOR ENHANCED USER AUTHENTICATION

(71) Applicant: MasterCard International Incorporated, Purchase, NY (US)

(72) Inventors: Ashish Raghavendra Tetali, Dardenne Prairie, MO (US); Ravi Kiran Avula, Lake St. Louis, MO (US); Uttra Singh Tetali, Dardenne Prairie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 260 days.

(21) Appl. No.: 15/481,248

(22) Filed: Apr. 6, 2017

(65) Prior Publication Data

US 2018/0293579 A1    Oct. 11, 2018

(51) Int. Cl.
*G06Q 20/40* (2012.01)
*G06Q 20/20* (2012.01)
*G06Q 20/36* (2012.01)
*G06Q 20/10* (2012.01)
*G06Q 20/32* (2012.01)

(52) U.S. Cl.
CPC ......... *G06Q 20/409* (2013.01); *G06Q 20/102* (2013.01); *G06Q 20/206* (2013.01); *G06Q 20/3224* (2013.01); *G06Q 20/3674* (2013.01); *G06Q 20/405* (2013.01); *G06Q 20/4012* (2013.01); *G06Q 20/4014* (2013.01); *G06Q 20/40145* (2013.01); *G06F 2221/2111* (2013.01); *H04L 2463/102* (2013.01)

(58) Field of Classification Search
CPC .. G06Q 20/409; G06Q 20/102; G06Q 20/206; G06Q 20/3224; G06Q 20/3674; G06Q 20/4012; G06Q 20/4014; G06Q 20/40145; G06Q 20/405; G06F 2221/2111; H04L 2463/102
See application file for complete search history.

(56) References Cited

U.S. PATENT DOCUMENTS 7,152,045 B2   12/2006   Hoffman
7,318,049 B2   1/2008    Iannacci
(Continued)

OTHER PUBLICATIONS

PCT International Search Report and Written Opinion, Application No. PCT/US2018/021733, dated May 24, 2018, 12 pps.

*Primary Examiner* — Robert R Niquette
*Assistant Examiner* — Liz P Nguyen
(74) *Attorney, Agent, or Firm* — Armstrong Teasdale LLP (57) ABSTRACT

A computer-implemented method for enhancing user authentication is provided. The method is implemented using an authentication computing device in communication with a memory. The method includes storing a plurality of user preferences associated with a user account. The user preferences are rule-based preferences that define steps to be taken for authenticating the user for accessing the user account. The method also includes receiving an authentication request for access to the user account, determining one or more authentication challenges based, at least in part, on the user preferences, transmitting the one or more authentication challenges to be presented to a user attempting to access the user account, and determining whether to authenticate the user based on a response to the one or more authentication challenges.

23 Claims, 6 Drawing Sheets

(56) References Cited

U.S. PATENT DOCUMENTS

| | | | |
|---|---|---|---|
| 8,646,060 B1* | 2/2014 | Ben Ayed | H04L 63/0853 726/9 |
| 9,306,930 B2* | 4/2016 | Keys | H04L 63/08 |
| 2005/0102243 A1* | 5/2005 | Kinsella | G06Q 20/04 705/67 |
| 2005/0125295 A1* | 6/2005 | Tidwell | G06Q 20/4016 705/16 |
| 2006/0005020 A1* | 1/2006 | Hardt | H04L 63/1416 713/166 |
| 2009/0152343 A1* | 6/2009 | Carter | G06Q 10/0633 235/379 |
| 2011/0087550 A1 | 4/2011 | Fordyce, III et al. | |
| 2011/0213709 A1 | 9/2011 | Newman et al. | |
| 2011/0251892 A1* | 10/2011 | Laracey | G06Q 30/0253 705/14.51 |
| 2011/0320345 A1* | 12/2011 | Taveau | G06Q 20/3226 705/39 |
| 2012/0323717 A1* | 12/2012 | Kirsch | G06Q 20/0855 705/26.1 |
| 2014/0283113 A1* | 9/2014 | Hanna | G06K 9/00067 726/27 |
| 2015/0046340 A1* | 2/2015 | Dimmick | G06Q 20/40 705/72 |
| 2015/0095971 A1* | 4/2015 | Roffe | G06F 21/445 726/1 |
| 2015/0149244 A1 | 5/2015 | Unser et al. | |
| 2015/0348001 A1* | 12/2015 | Van Os | G06Q 20/40 705/44 |

\* cited by examiner

SYSTEMS AND METHODS FOR ENHANCED USER AUTHENTICATION

BACKGROUND OF THE DISCLOSURE

The field of the disclosure relates generally to enhancing user authentication, and more specifically to methods and systems for authenticating a user by combining authentication preferences from the user and a third-party associated with the user.

At least some known credit/debit card purchases involve fraudulent activity. These fraudulent transactions present liability issues to one or more parties involved in the transaction, such as an issuing bank, a merchant, a payment processing network by authenticating the user of the payment card, or an acquirer bank. As such, these parties are interested in fraud detection, or the ability to analyze the data surrounding a payment card transaction before authorizing the transaction. For example, in online transactions through a merchant web site or "card-not-present" transactions, the merchant party in the transaction may assume initial liability for certain aspects of the transaction unless, for example, certain risk-mitigating steps are taken.

One such risk-mitigating step involves authenticating the cardholder. For example, some payment networks engage an authentication service that performs an authentication of a suspect consumer prior to authorization of the transaction. The authentication service determines if the initiator of the transaction is the authorized user of the payment card. In addition to the authentication system, many known systems also use a fraud scoring system to detect potentially fraudulent transactions. Although known systems exist, there exists a need for more advanced fraud detection systems.

BRIEF DESCRIPTION OF THE DISCLOSURE

In one aspect, a computer-implemented method for enhancing user authentication is provided. The method is implemented using an authentication computing device in communication with a memory. The method includes storing, at the authentication computing device, a plurality of user preferences associated with a user account. The user preferences are rule-based preferences that define steps to be taken for authenticating the user for accessing the user account. The method also includes receiving, at the authentication computing device, an authentication request for access to the user account, determining, by the authentication computing device, one or more authentication challenges based, at least in part, on the user preferences, transmitting the one or more authentication challenges to be presented to a user attempting to access the user account, and determining whether to authenticate the user based on a response to the one or more authentication challenges.

In another aspect, an authentication computing device used for enhanced user authentication is provided. The authentication computing device comprises a processor communicatively coupled to a memory device. The processor is programmed to store a plurality of user preferences associated with a user account. The user preferences are rule-based preferences that define steps to be taken for authenticating the user for accessing the user account. The processor is also programmed to receive an authentication request for access to the user account, determine one or more authentication challenges based, at least in part, on the user preferences, transmit the one or more authentication challenges to be presented to a user attempting to access the user account, and determine whether to authenticate the user based on a response to the one or more authentication challenges.

In yet another aspect, at least one non-transitory computer-readable storage media having computer-executable instructions embodied thereon is provided. When executed by an authentication computing device having at least one processor coupled to at least one memory device, the computer-executable instructions cause the processor to store a plurality of user preferences associated with a user account. The user preferences are rule-based preferences that define steps to be taken for authenticating the user for accessing the user account. The computer-executable instructions also cause the processor to receive an authentication request for access to the user account, determine one or more authentication challenges based, at least in part, on the user preferences, transmit the one or more authentication challenges to be presented to a user attempting to access the user account, and determine whether to authenticate the user based on a response to the one or more authentication challenges.

In still another aspect, a computer-implemented method for enhancing user authentication is provided. The method is implemented using an authentication computing device in communication with a memory. The method includes storing, at the authentication computing device, a plurality of user preferences associated with a plurality of user accounts. The user preferences are rule-based preferences that define steps to be taken for authenticating the user for accessing the user account. Each user account of the plurality of user accounts includes a unique identifier. Each user account is associated with a plurality of payment accounts. The method also includes receiving, at the authentication computing device, an authentication request for access to a user account of the plurality of user accounts including a unique identifier. The authentication request is associated with a payment transaction. The method further includes determining the user account of the plurality of user accounts associated with the unique identifier, determining a payment account of the plurality of payment accounts based on the authentication request and the plurality of user preferences, and authenticating access to the user account based on the authentication request and the user preferences.

BRIEF DESCRIPTION OF THE DRAWINGS

FIGS. 1-6 show example embodiments of the methods and systems described herein.

DETAILED DESCRIPTION OF THE DISCLOSURE

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure of the system and methods to enhance fraud detection while authenticating a payment cardholder by combining authentication preferences from the cardholder and the issuer bank.

One risk-mitigating step against fraudulent cardholder transactions is cardholder authentication. For example, some payment networks engage an authentication service that performs an authentication of a suspect consumer prior to authorization of the transaction. The authentication service determines if the source of the transaction is the authorized user of the payment card. During such authentication, the suspect consumer (i.e., the person attempting to perform the payment card transaction with the merchant) may be presented with an authentication challenge, sometimes called a "step-up challenge." This step-up challenge generally requires the suspect consumer to provide a password or a passcode from a second factor device before the transaction will be processed. By obtaining this additional factor from the suspect consumer, the likelihood of the suspect consumer being a fraudulent consumer is reduced. However, this extra step presents an interruptive inconvenience, a barrier, or an interference to at least some legitimate consumers and subsequently causes at least some consumers to abandon legitimate transactions. These abandonments result in lost revenues to many parties, such as the merchant, the merchant acquirer, and the issuer.

In the example embodiment, an authentication computer device associated with a payment network is configured to provide an enhanced cardholder authentication service. When a customer enrolls in the service, the customer provides one or more authentication signatures (e.g., a pin, password, pattern code, digital signature, and biometric signatures) and account information for one or more payment accounts of the customer to the authentication computer device. The authentication signatures and account information are stored by the authentication computer device as user preferences in a customer profile. The user preferences are rule-based preferences that define steps to be taken for authenticating the user for accessing the user account. In the example embodiment, the customer may customize his or her profile. For example, the customer may specify a preferred type of authentication challenge. The user may also set the authentication challenge required based on the type of transaction, the location, the amount of the transaction, and/or any combination of the above.

During a payment transaction with a merchant registered for the payment service, the merchant initiates the transaction through a point of sale (POS) device or a website ecommerce gateway that is in communication with the authentication computer device. The merchant provides a customer identifier (name, username, preliminary authentication, or another unique identifier) to the authentication computer device to enable the authentication computer device to identify the corresponding customer profile. The authentication computer device analyzes the initiated transaction to determine a type of authentication challenge to present to the customer. More specifically, based on the customer's preferences, the merchant's preferences, a risk assessment performed by the authentication computer device, geo location of the POS device, IP address of the computer device accessing the website, preferences of the issuer bank, and/or other analytics, the authentication computer device selects a type of authentication challenge to present the customer. The authentication challenge is presented to the customer via the POS device. Once the customer has responded, a challenge response is sent back to the authentication computer device.

The authentication computer device compares the challenge response to the stored authentication signatures to determine if the customer is authenticated. In some embodiments, the authentication computer device provides an additional step-up authentication challenge for transactions with relatively high risk of fraud.

In some embodiments, the service includes an electronic wallet that includes a plurality of payment accounts associated with the customer. The authentication computer device determines the payment account to use with the transaction based on the transaction itself. This determination may be based on the type of transaction, the amount of the transaction, the amount in each of the plurality of accounts, the location, and/or any potential rewards that may be earned from completing the transaction.

In a first example, a customer is on vacation on a beach. The customer does not have his payment card with him for security purposes. When the customer purchases drinks on the beach, the merchant provides a computer device for the customer to provide a unique identifier on. The merchant computer device transmits the unique identifier to the payment network. The payment network determines the account associated with the customer based on the unique identifier and processes the payment transaction for the drinks against that payment account. In a variation on the first example, the customer may attempt to access the payment account using an online payment gateway, such as at an ecommerce website.

In a second example, a customer is traveling for work and finds a gift that she wants to buy for her spouse. The customer has set preferences requiring a fingerprint authentication challenge for payment transactions over a certain amount outside of her home town. When the authentication computer device determines that the payment transaction is over the threshold and outside of the customer's hometown, the authentication computer device transmits a fingerprint authentication challenge to either the point of sale device or the customer's mobile device. The authentication computer device confirms the fingerprint prior to authenticating the customer for the payment transaction. In a variation on the second example, the customer may attempt to access the payment account using an online payment gateway, such as at an ecommerce website. The user preferences may indicate that all online transactions over a certain amount require an additional authentication challenge.

The methods and system described herein may be implemented using computer programming or engineering techniques including computer software, firmware, hardware, or any combination or subset. As disclosed above, at least one technical problem with prior systems is that there is a need for enhanced payment transaction authentication. The system and methods described herein address that technical problem. The technical effect of the systems and processes described herein is achieved by performing at least one of the following steps: (a) storing, at the authentication computing device, a plurality of user preferences associated with a user account, where the user preferences are rule-based preferences that define steps to be taken for authenticating the user for accessing the user account; (b) storing a plurality of issuer preferences associated with an issuer associated with the user account, where issuer preferences are rule-based preferences that define steps to be taken for authenticating the user for accessing the user account; (c) storing a plurality of requestor (e.g., merchant) preferences associated with a requestor associated with the authentication request, where the requestor preferences are rule-based preferences that define steps to be taken for authenticating the user for accessing the user account; (d) receiving, at the authentication computing device, an authentication request for access to the user account from the requestor, where the requestor is a merchant, the authentication request is associated with a payment transaction, and the user account is a payment card account; (e) comparing the user preferences with at least one of the issuer preferences and the requestor preferences; (f) determining, by the authentication computing device, one or more authentication challenges based, at least in part, on at least one of the user preferences, the issuer preferences, the requestor preferences, the comparison, the authentication request, a geolocation associated with the payment transaction, one or more capabilities of a point of sale device associated with the payment transaction, a type of the payment transaction, a location of the payment transaction, and an amount of the payment transaction, wherein the one or more authentication challenges includes a request for at least one of a pin, a password, a pattern code, a passcode, a digital signature, a signature capture, a biometric signature, a biometric sample, and an answer to a challenge question; (g) transmitting the one or more authentication challenges to at least one of a point of sale device, a mobile user device, and a user computer device to be presented to a user attempting to access the user account; and (h) determining whether to authenticate the user based on a response to the one or more authentication challenges. The resulting technical effect is that a more accurate authentication system provides a method of using user preferences to determine the authentication challenges used in the authentication process.

Another technical effect of the systems and processes described herein is achieved by performing at least one of the following steps: (a) storing a plurality of payment accounts in a virtual wallet; and (b) determining a payment account of the plurality of payment accounts for the payment transaction based in part on the user preferences and at least one of a type of the payment transaction, a current balance associated with the payment account, and one or more potential rewards based on the payment transaction and the payment account.

The resulting technical benefits achieved by this system include at least one of: (i) improving the overall efficiency of the payment network by reducing the number of data request challenges; (ii) reducing the number of denials for valid transactions; (iii) improved fraud detection; (iv) eliminating or reducing future chargebacks or disputes that need to be pursued; (v) improving the ability to authenticate a user with the capabilities of the devices available; and (vi) increasing user buy-in with authentication challenges to reduce user annoyance.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Figure 1:
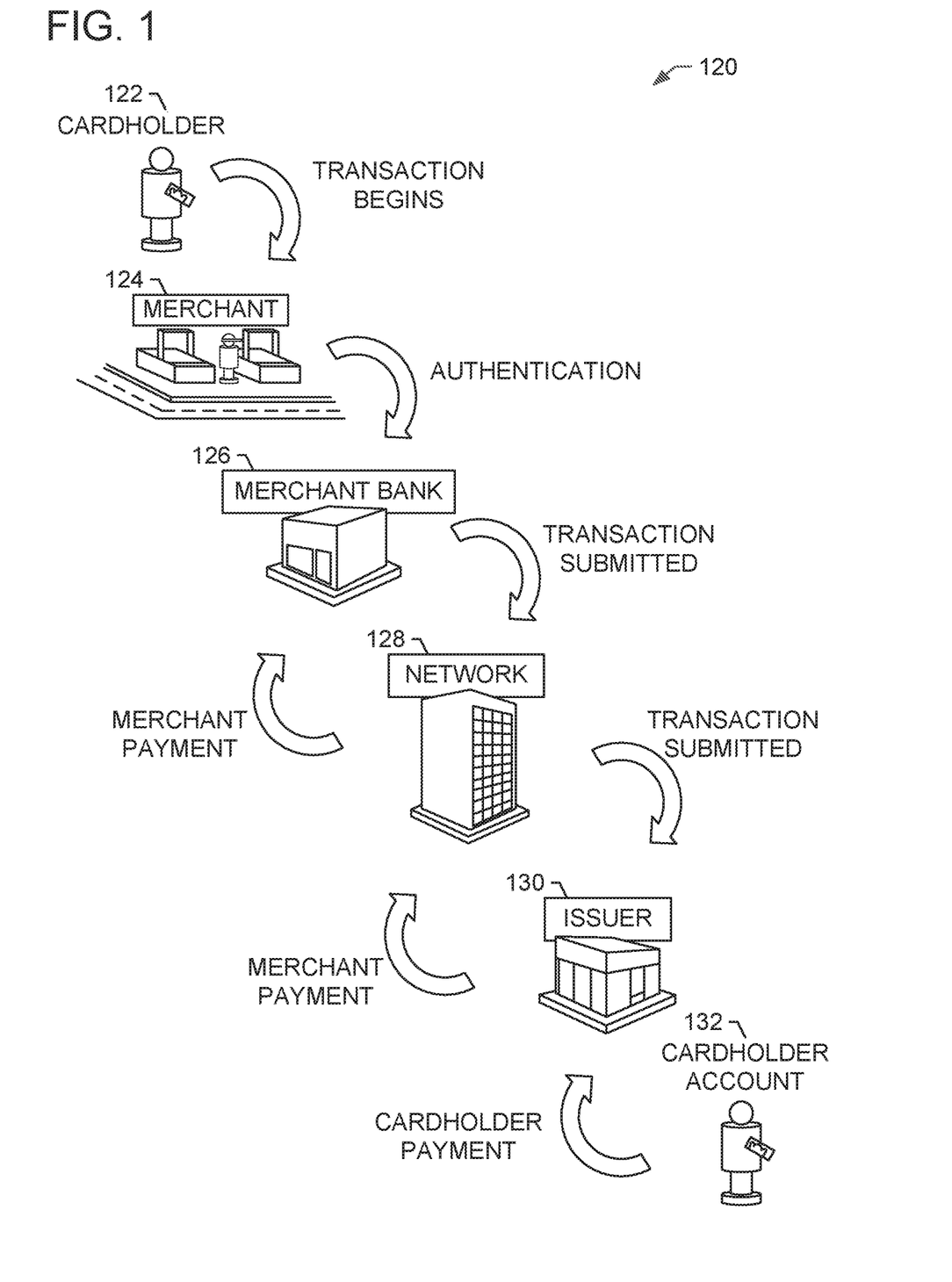
FIG. 1 is a schematic diagram illustrating an example multi-party payment card processing system for enabling payment-by-card transactions between merchants, cardholders, and card issuers.

FIG. 1 is a schematic diagram illustrating an example multi-party payment card processing system 120 for enabling payment-by-card transactions between merchants 124, cardholders 122, and card issuers 130. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In the payment card processing system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

In some embodiments, cardholder 122 registers one or more payment cards with a digital wallet. Having done this, cardholder 122 can interact with a participating online merchant 124. At the check-out stage, online merchant 124 displays a button on the merchant website which cardholder 122 can click on in order to make a payment using the cardholder's digital wallet. Online merchant 124 then redirects the user to a "switch" operated by interchange network 128. Using a cookie located on the cardholder's computer, the "switch" is able to determine which wallet-hosting server hosts a wallet associated with cardholder 122. The switch then establishes a connection between the cardholder's computer and the appropriate wallet-hosting system, which presents cardholder 122 with a sign-in page (e.g., as a pop-up window), where there is an authentication process (e.g., entry of a pre-agreed password). This log-in process may use the same login credentials (e.g., password) which the user also uses to obtain access to other online banking activities.

The wallet-hosting system then securely transfers the cardholder's payment information to the online merchant's domain. The merchant's domain submits the cardholder's payment information to acquiring bank 126 for a separate authorization process in which the acquiring domain communicates with the issuing bank 130 to ask the bank to authorize the transaction. Thus, cardholder 122 is not required to enter their card details (except at the stage of initially registering with the wallet-hosting system), and the online transaction process is streamlined with only a single redirection, and consistent branding for the entire payment process, irrespective of the online merchant 124.

In some embodiments, a unique identifier is provided to cardholder 122. The unique identifier is different from the cardholder's account number. In these embodiments, interchange network 128 stores the unique identifier in database 220 along with cardholder account 132. When interchange network 128 receives the unique identifier, interchange network 128 determines the associated cardholder account 132 and uses that information in processing the payment transaction.

Figure 2:
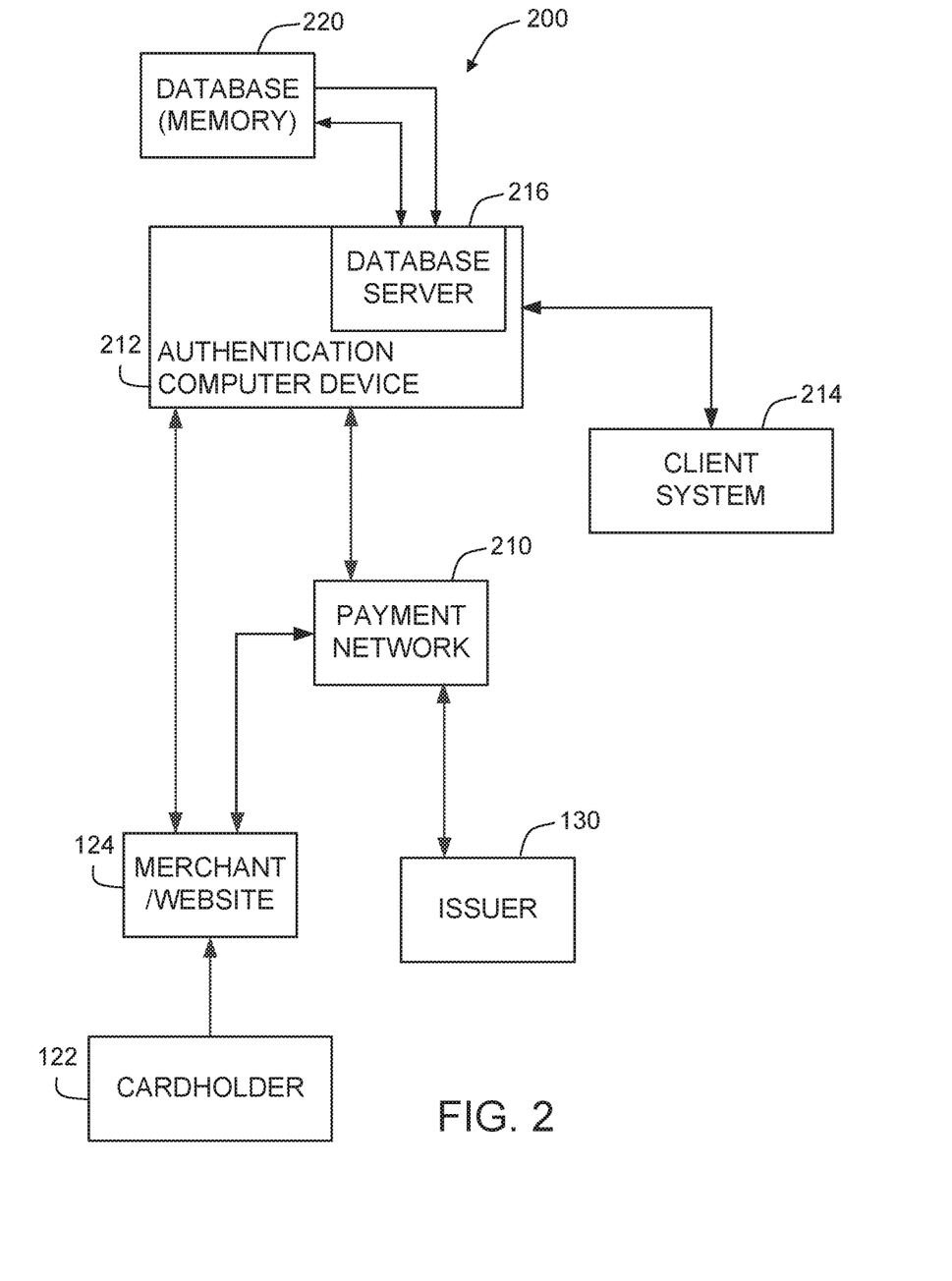
FIG. 2 is a simplified block diagram of an example system used for enhancing user authentication.

FIG. 2 is a simplified block diagram of an example system 200 used for enhancing user authentication. In the example embodiment, system 200 may be used for performing payment-by-card transactions received as part of processing cardholder transactions. In addition, system 200 is a payment processing system that includes an authentication computer device 212 configured to enhance user authentication. As described below in more detail, authentication computer device 212 is configured to store a plurality of user preferences associated with a user account; receive an authentication request for access to the user account; determine one or more authentication challenges based, at least in part, on the user preferences; transmit the one or more authentication challenges to be presented to a user attempting to access the user account; and determine whether to authenticate the user based on a response to the one or more authentication challenges.

In the example embodiment, client systems 214 are computers that include a web browser or a software application to enable client systems 214 to access authentication computer device 212 using the Internet. More specifically, client systems 214 are communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. Client systems 214 can be any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, cardholder 122 uses a client system 214 to access a commerce website for merchant 124. In another embodiment, cardholder 122 uses client system 214 to register for an enhanced authentication service, to set preferences for authentication, and to access a virtual wallet.

A database server 216 is communicatively coupled to a database 220 that stores data. In one embodiment, database 220 includes user preferences, authentication challenges, issuer preferences, and merchant preferences. In the example embodiment, database 220 is stored remotely from authentication computer device 212. In some embodiments, database 220 is decentralized. In the example embodiment, a person can access database 220 via client systems 214 by logging onto authentication computer device 212, as described herein.

Authentication computer device 212 is communicatively coupled with payment network 210. Payment network 210 represents one or more parts of payment network 120 (shown in FIG. 1). In the example embodiment, authentication computer device 212 is in communication with one or more computer devices associated with interchange network 128. In other embodiments, authentication computer device 212 is in communication with one or more computer devices associated with merchant 124, merchant bank 126 (shown in FIG. 1), or issuer bank 130 (shown in FIG. 1). In some embodiments, authentication computer device 212 may be associated with, or is part of payment network 120, or in communication with payment network 120, shown in FIG. 1. In other embodiments, authentication computer device 212 is associated with a third party and is in communication with payment network 120. In some embodiments, authentication computer device 212 may be associated with, or be part of merchant bank 126, interchange network 128, and issuer bank 130. In addition, authentication computer device 212 is communicatively coupled with merchant 124. In the example embodiment, authentication computer device 212 is in communication with merchant 124 and client systems 214 via Application Programming Interface (API) calls. Through the API call, merchant 124 may transmit information to and receive information from authentication computer device 212.

In the example embodiment, authentication computer device 212 is associated with a payment network 210 and is configured to provide an enhanced cardholder authentication service. When a customer, such as cardholder 122 shown in FIG. 1, enrolls in the service, the customer provides one or more authentication signatures (e.g., a pin, password, pattern code, digital signature, and biometric signatures) and account information for one or more payment accounts of the customer to authentication computer device 212. The authentication signatures and account information are stored by authentication computer device 212 in database 220 as user preferences in a customer profile. The user preferences are rule-based preferences that define steps to be taken for authenticating the user for accessing the user account. In the example embodiment, the customer may customize his or her profile. For example, the customer may specify a preferred type of authentication challenge. The user may also set the authentication challenge required based on the type of transaction, the location, the amount of the transaction, and/or any combination of the above. The customer may also login to authentication computer device 212 using a client system 214 to update or change the user preferences.

In some embodiments, authentication computer device 212 may be associated with the financial transaction interchange network 128 shown in FIG. 1 and may be referred to as an interchange computer system. Authentication computer device 212 may be used for processing transaction data and analyzing for fraudulent transactions. In addition, at least one of client systems 214 may include a computer system associated with an issuer 130 of a transaction card. Accordingly, authentication computer device 212 and client systems 214 may be utilized to process transaction data relating to purchases a cardholder 122 makes utilizing a transaction card processed by interchange network 128 and issued by the associated issuer 130. At least one client system 214 may be associated with a user or a cardholder 122 seeking to register, access information, or process a transaction with at least one of interchange network 128, issuer 130, or merchant 124. In addition, client systems 214 may include point-of-sale (POS) devices associated with merchant 124 and used for processing payment transactions. Furthermore, client systems 214 may be used by cardholders or other users to access user accounts online, such as through ecommerce gateways.

Figure 3:
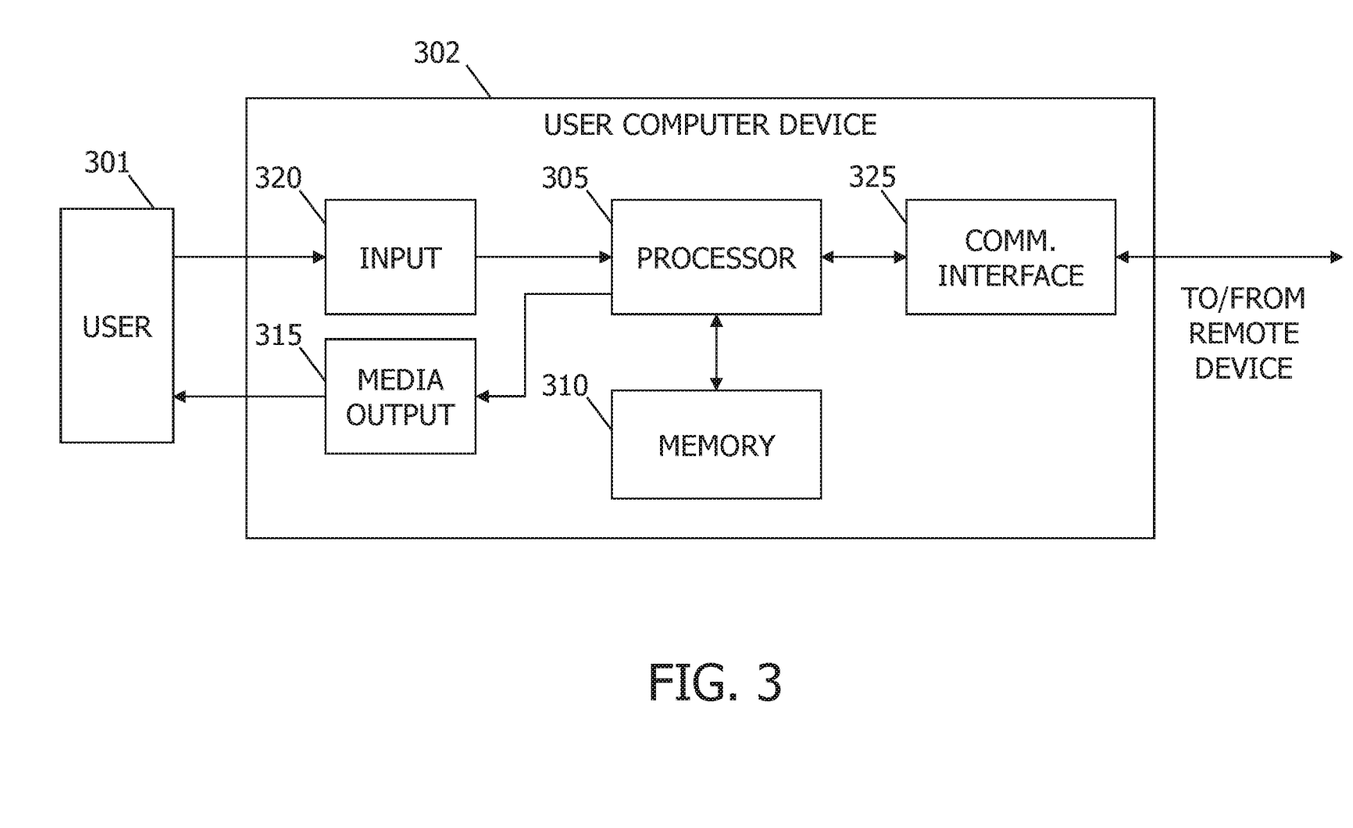
FIG. 3 illustrates an example configuration of a client system shown in FIG. 2, in accordance with one embodiment of the present disclosure.

FIG. 3 illustrates an example configuration of a client system 214 shown in FIG. 2, in accordance with one embodiment of the present disclosure. User computer device 302 is operated by a user 301. User computer device 302 may include, but is not limited to, client systems 214, computer devices associated with merchant 124, and computer devices associated with cardholder 122 (both shown in FIG. 1). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer-readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as authentication computer device 212 (shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website from authentication computer device 212. A client application allows user 301 to interact with, for example, verification computer device 212. For example, instructions may be stored by a cloud service and the output of the execution of the instructions sent to the media output component 315.

Figure 4:
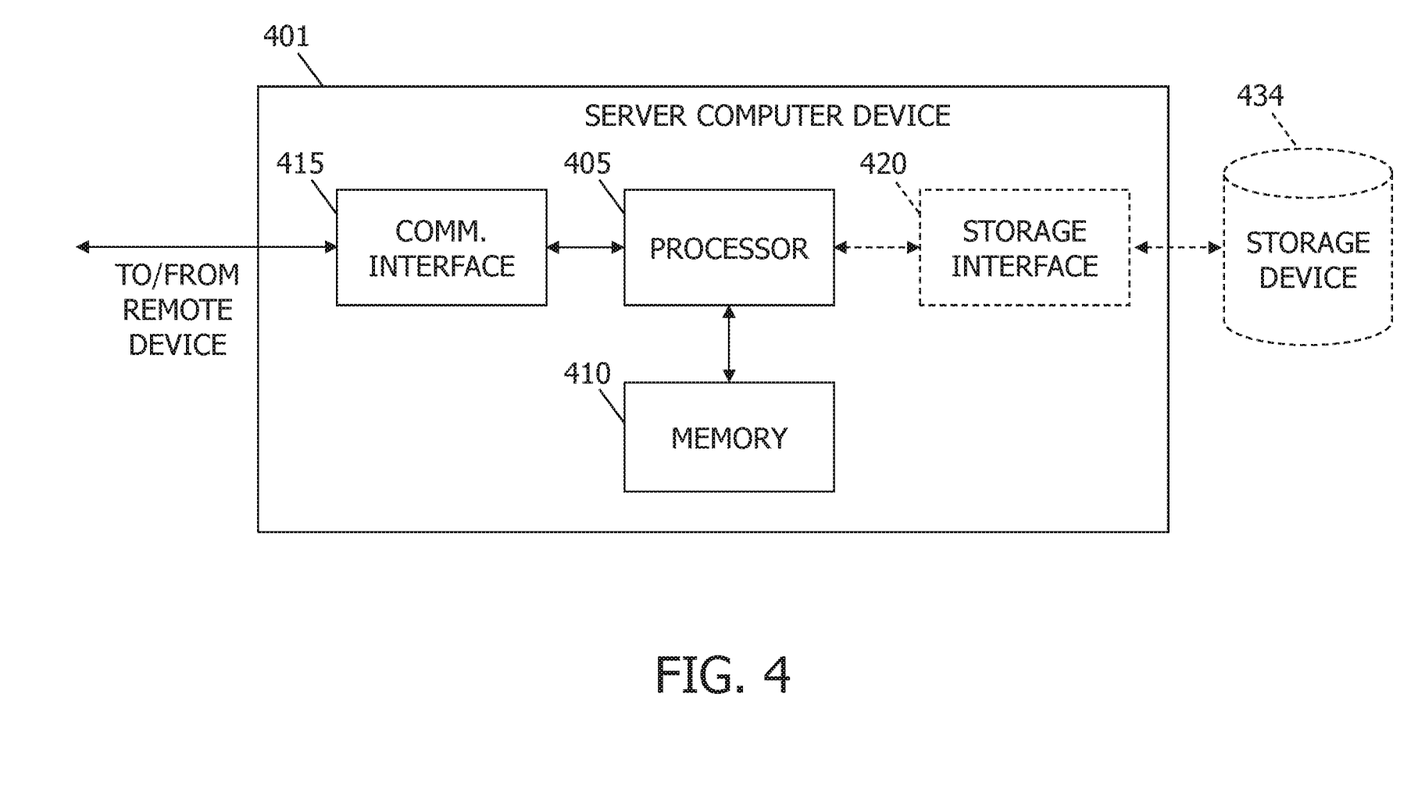
FIG. 4 illustrates an example configuration of a server system shown in FIG. 2, in accordance with one embodiment of the present disclosure.

FIG. 4 illustrates an example configuration of a server system shown in FIG. 2, in accordance with one embodiment of the present disclosure. Server computer device 401 may include, but is not limited to, database server 216, merchant/website server 124, and authentication computer device 212 (all shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 214, merchant/website server 124, or authentication computer device 212 (all shown in FIG. 2). For example, communication interface 415 may receive requests from client systems 214 via the Internet.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 5.

Figure 5:
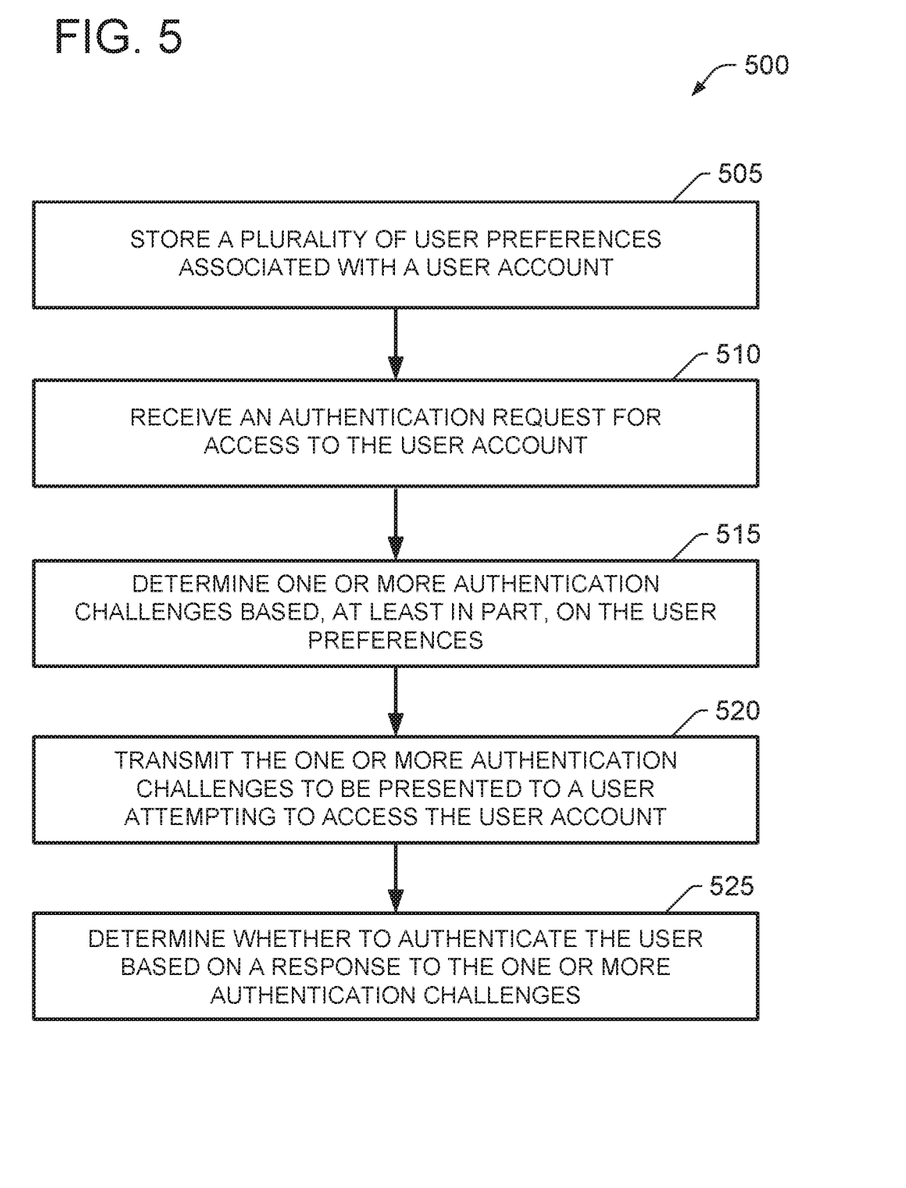
FIG. 5 is a flow chart of a process for enhancing user authentication using the system shown in FIG. 2.

FIG. 5 is a flow chart of a process 500 for enhancing use authentication using system 200 shown in FIG. 2. In the example embodiment, process 500 is performed by authentication computer device 212 (shown in FIG. 2).

In the example embodiment, authentication computer device 212 stores 505 a plurality of user preferences associated with a user account, such as in database 220 (shown in FIG. 2). The user preferences are rule-based preferences that define steps to be taken for authenticating the user for accessing the user account. In the example embodiments, the user account is a payment card account, such as cardholder account 132 (shown in FIG. 1). In other embodiments, user account is another type of account that requires user authentication, such as, but not limited to, a loan account, a video game account, a website account, a streaming service account, or any other account that requires authenticating the user. In the example embodiment, the user preferences include the user's preferred authentication challenges, such as, but not limited to, a passcode, a pin, a pattern code, a signature capture, a digital signature, a drawn pattern, one or more challenge questions, and a biometric sample or signature, such as voice recognition or fingerprint. The user preferences may also include restrictions on when the different authentication challenges are used. Other examples of authentication challenges include, but are not limited to, at least one of a low-energy infrared retinal scan, a finger vein scan, a near infrared iris scan, an optical fingerprint scan, a three-dimensional (3D) fingerprint scan, an optical palm print, a 3D facial scan, an optical facial scan, and speech recognition (including text-dependent and text-independent speech recognition).

For example, when logging into a user account on a user computer device for the first time, a user preference may indicate that a specific authentication challenge be presented. In a payment transaction example, a user preference may be that the user indicates that all charges under $10 do not require an authentication challenge. In another payment transaction example, a user preference indicates a dollar threshold for the authentication challenged based on location. In this example, the user sets a $100 threshold within 5 miles of the user's residence, where transactions under this threshold amount in the approved area do not require an authentication challenge. However, transactions over that amount require an authentication challenge. The user may also require that all transactions outside of the 5 mile area require an authentication challenges and that transactions outside of the 5 mile area and over a threshold dollar amount require more than one authentication challenge or a different authentication challenge.

In the example embodiment, authentication computer device 212 receives 510 an authentication request for access to the user account. In the example embodiment, the authentication request is received from a merchant conducting a payment transaction with the user. In other embodiments, the authentication request is received from a user computer device, such as client device 214 (shown in FIG. 2), that is attempting to access the user account. In a payment transaction embodiment, the user device may belong to the user attempting to make a purchase or to merchant 124 that is hosting the website conducting the payment transaction.

In the example embodiment, authentication computer device 212 determines 515 one or more authentication challenges based, at least in part, on the stored user preferences. Authentication computer device 212 analyzes the user preferences and the authentication request to determine 515 whether or not an authentication challenge is warranted to respond to the authentication request. If an authentication challenge is warranted, authentication computer device 212 determines 515 which authentication challenges are warranted. Authentication computer device 212 may base the determination 515 of the one or more authentication challenges on at least one of the geographic location of the payment transaction, the transaction type, transaction volume, and amount of the payment transaction. The user may also set preferences based on transaction type, where transactions for fuel and/or parking do not required further authentication challenges, or where other transaction types, such as food and jewelry, would.

In the example embodiment, authentication computer device 212 transmits 520 the one or more authentication challenges to be presented to the user attempting to access the user account. In the example embodiment, authentication computer device 212 transmits the one or more authentication challenges to client system 214, such as a mobile computer device, a point of sale device, and a user computer device, where client system 214 is configured to present the one or more authentication challenges to the user. In some embodiments, client system 214 is in communication with another computer device, such as through a Near Field Communication (NFC) connection. In these embodiments, client system 214 transmits the one or more authentication challenges to the other computer device to be presented to the user attempting access. Client system 214 receives the response(s) from the user and transmits those responses to authentication computer device 212. Authentication computer device 212 determines 525 whether or not to authenticate the user based on the response(s) to the one or more authentication challenges. In the example embodiment, authentication computer device 212 transmits that determination to the requestor. In other embodiments, authentication computer device 212 transmits the results of the authentication challenge to the requestor and the requestor determines whether or not the user is authenticated.

In some embodiments, authentication computer device 212 determines that no authentication challenges are needed, such as when the transaction amount is below a certain threshold. In these embodiments, authentication computer device 212 determines 525 whether or not to authenticate the user and transmits the determination to the requestor.

In some embodiments, database 220 also contains a plurality of issuer preferences associated with the issuer associated with the user account. The issuer preferences are rule-based preferences that define steps to be taken for authenticating the user for accessing the user account. In some embodiments, the issuer is similar to issuer bank 130 (shown in FIG. 1). In other embodiments, the issuer may be the administrator of the user accounts, such as the administrator of a webpage. The issuer preferences are similar to the user preferences, but from the issuer point of view. These preferences contain any restrictions or preferences that the issuer has on user access to the user account. For example, issuer preferences may include preferred authentication challenges, thresholds for different authentication challenges, and authentication rules. Authentication computer device 212 compares the user preferences with the issuer preferences to determine 515 the one or more authentication challenges based on the comparison and the authentication request. For example, the user may have a preference for authentication challenges A & B and the issuer may have a preference set for authentication challenges B & C. In this case, authentication computer device 212 determines 515 that the authentication challenge is to be B. In another example, the user has a requirement that authentication challenge A is required when the transaction is more than $150 and the issuer has a requirement that authentication challenge B is required when the transaction is more than $100. If the transaction is $125, then authentication challenge B is transmitted to the user. In some embodiments, issuer preferences overrule user preferences. If the transaction had been for $175, then authentication challenge B would still be transmitted to the user.

In some embodiments, database 220 also contains a plurality of requestor preferences associated with the requestor associated with the user account. The requestor preferences are rule-based preferences that define steps to be taken for authenticating the user for accessing the user account. In the example embodiment, the requestor is merchant 124 requesting access to funds in user payment account 132 (shown in FIG. 1). The requestor preferences are similar to the user preferences, but from the requestor (or merchant) point of view. These preferences contain any restrictions or preferences that the requestor has on user access to the user account. For example, requestor preferences may include preferred authentication challenges, thresholds for different authentication challenges, and authentication rules. Authentication computer device 212 compares the user preferences with the requestor preferences to determine 515 the one or more authentication challenges based on the comparison and the authentication request. For example, the user may have a preference for authentication challenges A & B and the requestor may have a preference set for authentication challenges B & C. In this case, authentication computer device 212 determines that the authentication challenge is to be B. In another example, the user has a requirement that authentication challenge A is required when the transaction is more than $150 and the requestor has a requirement that authentication challenge B is required when the transaction is more than $100. If the transaction is $125, then authentication challenge B is transmitted to the user. In some embodiments, requestor preferences overrule user preferences. If the transaction had been for $175, then authentication challenge B would still be transmitted to the user. In these embodiments, authentication computer device 212 may compare the user preferences, the requestor preferences, and the issuer preferences in determining 515 the one or more authentication challenges. In some situations, where there is a conflict between the user preferences, the requestor preferences, and the issuer preferences, authentication computer device 212 may include one or more rules about which preferences have priority. Authentication computer device 212 may also determine that multiple authentication challenges are required based on the user preferences, the requestor preferences, and the issuer preferences.

In some embodiments, authentication computer device 212 determines 515 the one or more authentication challenges based on the capabilities of a point of sale device associated with the payment transaction. For example, if the point of sale device is unable to receive a biometric sample, such as a fingerprint, from candidate cardholder 122 (shown in FIG. 1), then authentication computer device 212 will base the determined one or more authentication challenges on that capability. In that situation, authentication computer device 212 may request a different authentication challenge that the point of sale device is capable of performing. Or authentication computer device 212 may transmit the authentication challenge for the fingerprint to a mobile device, such as a smartphone, associated with candidate cardholder 122, where the mobile device is capable of taking an image of candidate cardholder's fingerprint.

In some embodiments, cardholder 122 has a plurality of payment accounts (for payment cards) stored in a virtual wallet. In these embodiments, authentication computer device 212 determines a payment account for the payment transaction based in part on the user preferences. For example, the user may have a payment card that is preferred for fuel purchases. In this example, authentication computer device 212 determines that the payment transaction is for fuel and selects the preferred card for that transaction. In other embodiments, authentication computer device 212 may determine the payment card to select based on a promotional rate or reward associated with the different payment cards. In some embodiments, authentication computer device 212 determines which payment account to use based on the type of the payment transaction, a current balance associated with each of the payment accounts, and one or more potential rewards for using each particular payment account with the payment transaction.

In some payment transaction embodiments, authentication computer device 212 receives a unique identifier instead of a payment account number. In these embodiments, authentication computer device 212 determines the payment account associated with the unique identifier through a lookup in database 220.

Figure 6:
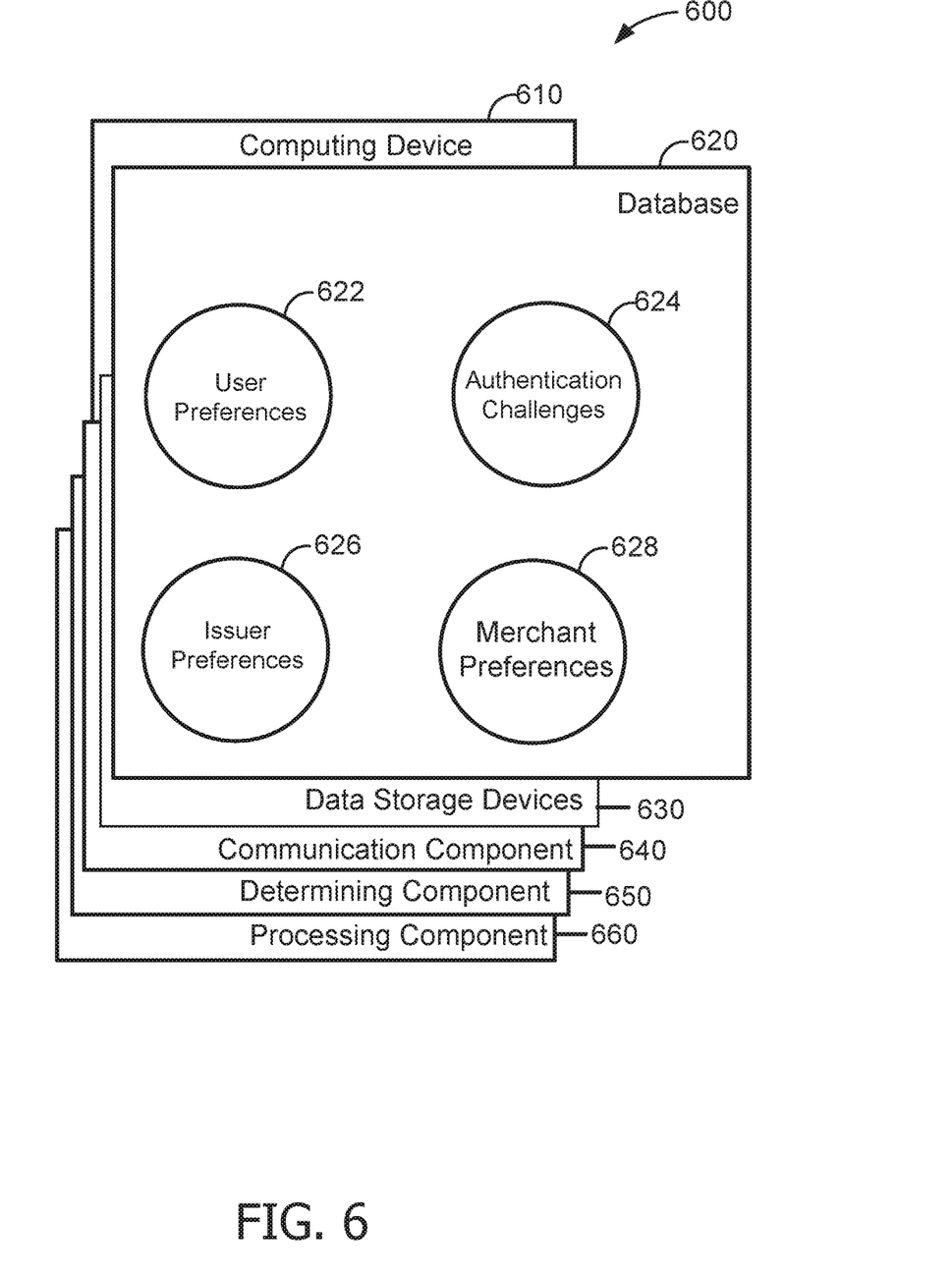
FIG. 6 is a diagram of components of one or more example computing devices that may be used in the system shown in FIG. 2.

FIG. 6 is a diagram 600 of components of one or more example computing devices that may be used in system 200 shown in FIG. 2. In some embodiments, computing device 610 is similar to authentication computer device 212 (shown in FIG. 2). Database 620 may be coupled with several separate components within computing device 610, which perform specific tasks. In this embodiment, database 620 includes user preferences 622, authentication challenges 624, issuer preferences 626, and merchant preferences 628. In some embodiments, database 620 is similar to database 220 (shown in FIG. 2).

Computing device 610 includes database 620, as well as data storage devices 630. Computing device 610 also includes a communication component 640 for receiving 510 an authentication request and transmitting 520 one or more authentication challenges (both shown in FIG. 5). Computing device 610 also includes a determining component 650 for determining 515 one or more authentication challenges (shown in FIG. 5). A processing component 660 assists with execution of computer-executable instructions associated with the system.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A computer-implemented method for enhancing user authentication, said method implemented using an authentication computing device in communication with a memory, said method comprising:
receiving, at the authentication computing device from a client computing system, an enrollment request from a user, the enrollment request identifying a user account of the user and a plurality of user preferences, wherein each of the plurality of user preferences define steps for a corresponding one of a first plurality of methods of authenticating the user;
in response to the authentication request, enrolling, at the authentication computing device, the user and storing, in the memory, the plurality of user preferences;
storing, in the memory at the authentication computing device, a plurality of requestor preferences associated with a merchant, wherein each of the plurality of requestor preferences define steps for a corresponding one of a second plurality of methods of authenticating the user;
receiving, at the authentication computing device from a requestor computer device associated with the merchant, in response to a request by a presenting person to pay for a transaction at the merchant using the user account, an authentication request for confirming the presenting person as authorized to use the user account for the transaction, wherein the authentication request is received after the storing of the user preferences and the requestor preferences in the memory;
retrieving, by the authentication computing device from the memory, the user preferences corresponding to the user account and the requestor preferences corresponding to the merchant;
comparing, by the authentication computing device, the first plurality of methods of authenticating the user from the retrieved user preferences to the second plurality of methods of authenticating the user from the retrieved requestor preferences;
selecting, by the authentication computing device based on the comparison, a first authentication challenge, wherein the first authentication challenge corresponds to a respective one of both the first plurality of methods of authenticating the user from the retrieved user preferences and the second plurality of methods of authenticating the user from the retrieved requestor preferences;
transmitting, to at least one of the requestor computer device and a user computer device, the first authentication challenge;
receiving, at the authentication computing device from the at least one of the requestor computer device and the user computer device, a response to the first authentication challenge;
determining, at the authentication computing device, whether to authenticate the user based on the response to the first authentication challenge; and
transmitting, by the authentication computing device to the requestor computing device, the determination.

2. The computer-implemented method in accordance with claim 1, wherein the first authentication challenge includes at least one of a low-energy infrared retinal scan, a finger vein scan, a near infrared iris scan, an optical fingerprint scan, a three-dimensional (3D) fingerprint scan, an optical palm print, a 3D facial scan, an optical facial scan, and speech recognition.

3. The computer-implemented method in accordance with claim 1 further comprising:
storing a plurality of issuer preferences associated with an issuer associated with the user account, wherein the plurality of issuer preferences define steps for a corresponding one of a third plurality of methods of authenticating the user for accessing the user account; and
wherein selecting the first authentication challenge is further based on the plurality of issuer preferences.

4. The computer-implemented method in accordance with claim 1 further comprising:
determining a plurality of authentication challenges contained in both the first and the second pluralities of methods of authenticating the user; and
wherein selecting the first authentication challenge comprises selecting from among the plurality of authentication challenges.

5. The computer-implemented method in accordance with claim 4, wherein the plurality of requestor preferences overrule the plurality of user preferences.

6. The computer-implemented method in accordance with claim 1, wherein the user account is a payment card account.

7. The computer-implemented method in accordance with claim 1, wherein selecting the first authentication challenge is further based on a geolocation associated with the payment transaction.

8. The computer-implemented method in accordance with claim 1, wherein selecting the first authentication challenge is further based on one or more capabilities of a point of sale device associated with the payment transaction.

9. The computer-implemented method in accordance with claim 1, wherein selecting the first authentication challenge is further based on at least one of a type of the payment transaction, a transaction volume, a location of the payment transaction, and an amount of the payment transaction.

10. The computer-implemented method in accordance with claim 1, further comprising:
storing a plurality of payment accounts associated with the user account in a virtual wallet; and
determining a payment account of the plurality of payment accounts for the payment transaction based in part on the plurality of user preferences.

11. The computer-implemented method in accordance with claim 10, wherein determining a payment account is further based on at least one of a type of the payment transaction, a current balance associated with the payment account, and one or more potential rewards based on the payment transaction and the payment account.

12. The computer-implemented method in accordance with claim 1, wherein transmitting the first authentication challenge further comprises transmitting the first authentication challenge to at least one of a point of sale device, a mobile user device, and a user computer device.

13. The computer-implemented method in accordance with claim 1, wherein the first authentication challenge includes a request for at least one of a pin, a password, a pattern code, a passcode, a digital signature, a signature capture, a biometric signature, a biometric sample, and an answer to a challenge question.

14. An authentication computing device used for enhanced user authentication, said authentication computing device comprising a processor communicatively coupled to a memory device, said processor programmed to:
receive, from a client computing system, an enrollment request from a user, the enrollment request identifying a user account of the user and a plurality of user preferences, wherein each of the plurality of user preferences define steps for a corresponding one of a first plurality of methods of authenticating the user;
in response to the authentication request, enroll the user and store, in the memory device, the plurality of user preferences;
store in the memory device a plurality of requestor preferences associated with a merchant, wherein each of the plurality of requestor preferences define steps for a corresponding one of a second plurality of methods of authenticating the user;
receive, from a requestor computer device associated with the merchant, in response to a request by a presenting person to pay for a transaction at the merchant using the user account, an authentication request for confirming the presenting person as authorized to use the user account for the transaction, wherein the authentication request is received after the storing of the user preferences and the requestor preferences in the memory;
retrieve, from the memory device, the user preferences corresponding to the user account and the requestor preferences corresponding to the merchant;
compare the first plurality of methods of authenticating the user from the retrieved user preferences to the second plurality of methods of authenticating the user from the retrieved requestor preferences;
select, based on the comparison, a first authentication challenge, wherein the first authentication challenge corresponds to a respective one of both the first plurality of methods of authenticating the user from the retrieved user preferences and the second plurality of methods of authenticating the user from the retrieved requestor preferences;
transmit, to at least one of the requestor computer device and a user computer device, the first authentication challenge;
receive, from the at least one of the requestor computer device and the user computer device, a response to the first authentication challenge;
determine whether to authenticate the user based on the response to the first authentication challenge; and
transmit to the requestor computing device the determination.

15. The authentication computing device in accordance with claim 14, wherein the processor is further programmed to:
store a plurality of issuer preferences associated with an issuer associated with the user account, wherein the plurality of issuer preferences define steps for a corresponding one of a third plurality of methods of authenticating the user for accessing the user account; and
wherein selecting the first authentication challenge is further based on the plurality of issuer preferences.

16. The authentication computing device in accordance with claim 14, wherein the processor is further programmed to:
transmit a second authentication challenge from the second plurality of methods of authenticating the user from the retrieved requestor preferences.

17. The authentication computing device in accordance with claim 14, wherein the user account is a payment card account.

18. The authentication computing device in accordance with claim 14, wherein the processor is further programmed to determine the first authentication challenge based on a geolocation associated with the payment transaction.

19. The authentication computing device in accordance with claim 14, wherein the processor is further programmed to determine the first authentication challenge based on one or more capabilities of a point of sale device associated with the payment transaction.

20. The authentication computing device in accordance with claim 14, wherein the processor is further programmed to:
store a plurality of payment accounts associated with the user account in a virtual wallet; and
determine a payment account of the plurality of payment accounts for the payment transaction based in part on the plurality of user preferences.

21. A non-transitory computer-readable storage media having computer-executable instructions embodied thereon, wherein when executed by an authentication computing device having at least one processor coupled to at least one memory device, the computer-executable instructions cause the processor to:
receive, from a client computing system, an enrollment request from a user, the enrollment request identifying a user account of the user and a plurality of user preferences, wherein each of the plurality of user preferences define steps for a corresponding one of a first plurality of methods of authenticating the user;
in response to the authentication request, enroll the user and store, in the at least one memory device, the plurality of user preferences;
store in the at least one memory device a plurality of requestor preferences associated with a merchant, wherein each of the plurality of requestor preferences define steps for a corresponding one of a second plurality of methods of authenticating the user;
receive, from a requestor computer device associated with the merchant, in response to a request by a presenting person to pay for a transaction at the merchant using the user account, an authentication request for confirming the presenting person as authorized to use the user account for the transaction, wherein the authentication request is received after the storing of the user preferences and the requestor preferences in the memory;
retrieve, from the at least one memory device, the user preferences corresponding to the user account and the requestor preferences corresponding to the merchant;

compare the first plurality of methods of authenticating the user from the retrieved user preferences to the second plurality of methods of authenticating the user from the retrieved requestor preferences;
select, based on the comparison, a first authentication challenge, wherein the first authentication challenge corresponds to a respective one of both the first plurality of methods of authenticating the user from the retrieved user preferences and the second plurality of methods of authenticating the user from the retrieved requestor preferences;
transmit, to at least one of the requestor computer device and a user computer device, the first authentication challenge;
receive, from the at least one of the requestor computer device and the user computer device, a response to the first authentication challenge;
determine whether to authenticate the user based on the response to the first authentication challenge; and
transmit to the requestor computing device the determination.

22. A computer-implemented method for enhancing user authentication, said method implemented using an authentication computing device in communication with a memory, said method comprising:
receiving, at the authentication computing device from a plurality of client computing systems, a respective enrollment request from each of a plurality of users, each enrollment request identifying a respective user account of a plurality of user accounts and a respective plurality of user preferences, wherein each of the plurality of user preferences define steps for a corresponding one of a first plurality of methods of authenticating the respective user;
in response to the authentication request, enrolling, at the authentication computing device, the plurality of users and storing, in the memory, the plurality of user preferences for each respective user;
storing, in the memory at the authentication computing device, a plurality of requestor preferences associated with a merchant, wherein each of the plurality of requestor preferences define steps for a corresponding one of a second plurality of methods of authenticating the user, wherein each user account of the plurality of user accounts includes a unique identifier, and wherein each user account is associated with a plurality of payment accounts;
receiving, at the authentication computing device associated with the merchant, in response to a request by a presenting person to pay for a transaction at the merchant using a user account of the plurality of user accounts, an authentication request including a unique identifier, wherein the authentication request is for confirming the presenting person as authorized to use the user account for the transaction, wherein the authentication request is received after the storing of the user preferences and the requestor preferences in the memory;
determining the user account of the plurality of user accounts associated with the unique identifier;
determining a payment account of the plurality of payment accounts based on the authentication request and the plurality of user preferences;
retrieving, by the authentication computing device from the memory, the user preferences corresponding to the user account and the requestor preferences corresponding to the merchant;
comparing, by the authentication computing device, the first plurality of methods of authenticating the user from the retrieved user preferences to the second plurality of methods of authenticating the user from the retrieved requestor preferences;
selecting, by the authentication computing device based on the comparison, a first authentication challenge, wherein the first authentication challenge corresponds to a respective one of both the first plurality of methods of authenticating the user from the retrieved user preferences and the second plurality of methods of authenticating the user from the retrieved requestor preferences;
transmitting, to at least one of the requestor computer device and a user computer device, the first authentication challenge;
receiving, at the authentication computing device from the at least one of the requestor computer device and the user computer device, a response to the first authentication challenge;
determining, at the authentication computing device, whether to authenticate the user based on the response to the first authentication challenge; and
transmitting, by the authentication computing device to the requestor computing device, the determination.

23. The computer-implemented method in accordance with claim 22, wherein determining a payment account is further based on at least one of a promotional rate of at least one of the plurality of payment accounts, a type of the payment transaction, a current balance associated with each of the payment accounts, and one or more potential rewards for using each particular payment account with the payment transaction.

* * * * *